J. CALLOW.
APPARATUS FOR PROVING DOUGH.
APPLICATION FILED FEB. 27, 1909.

1,130,568.

Patented Mar. 2, 1915.
4 SHEETS—SHEET 1.

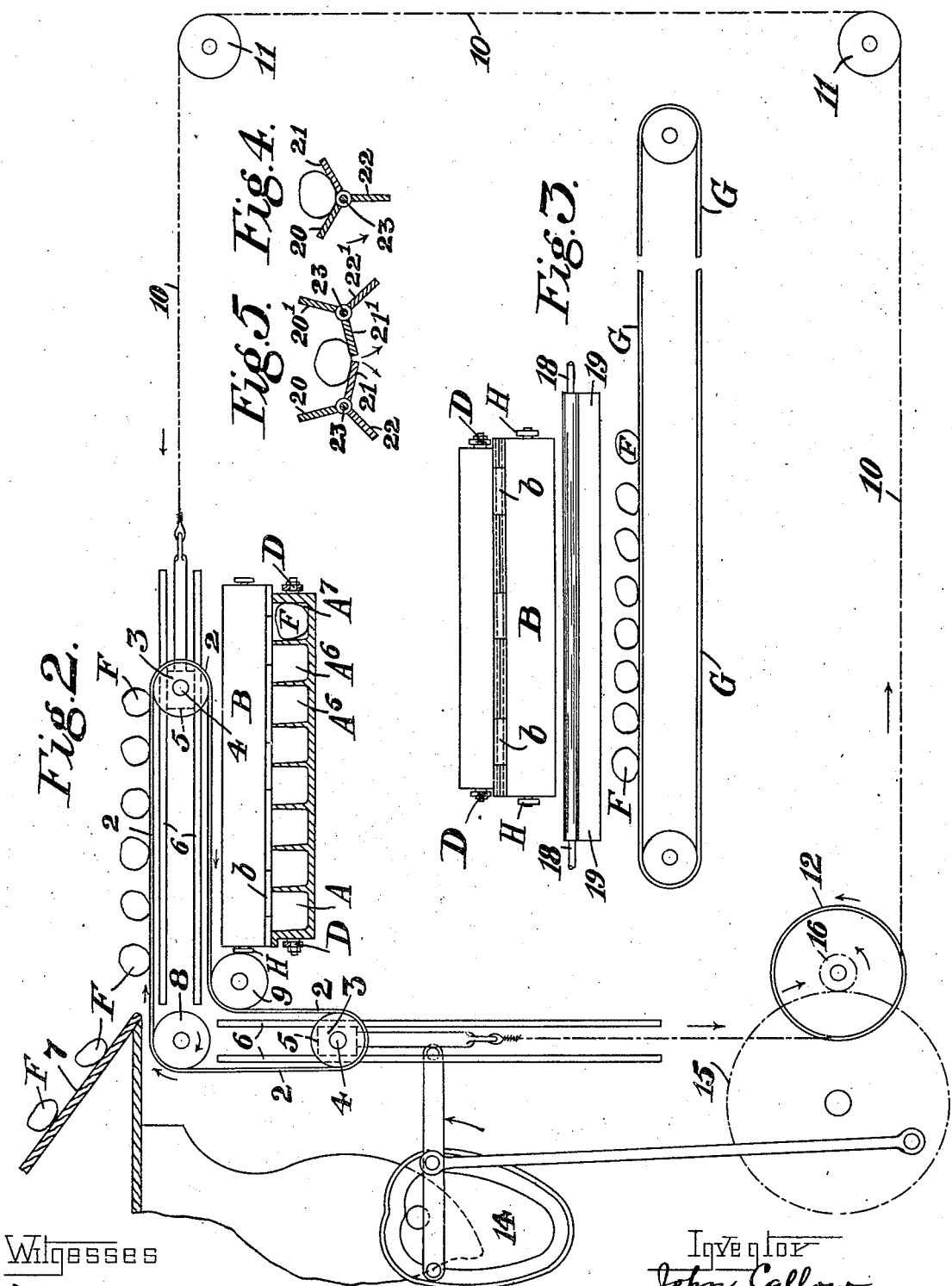

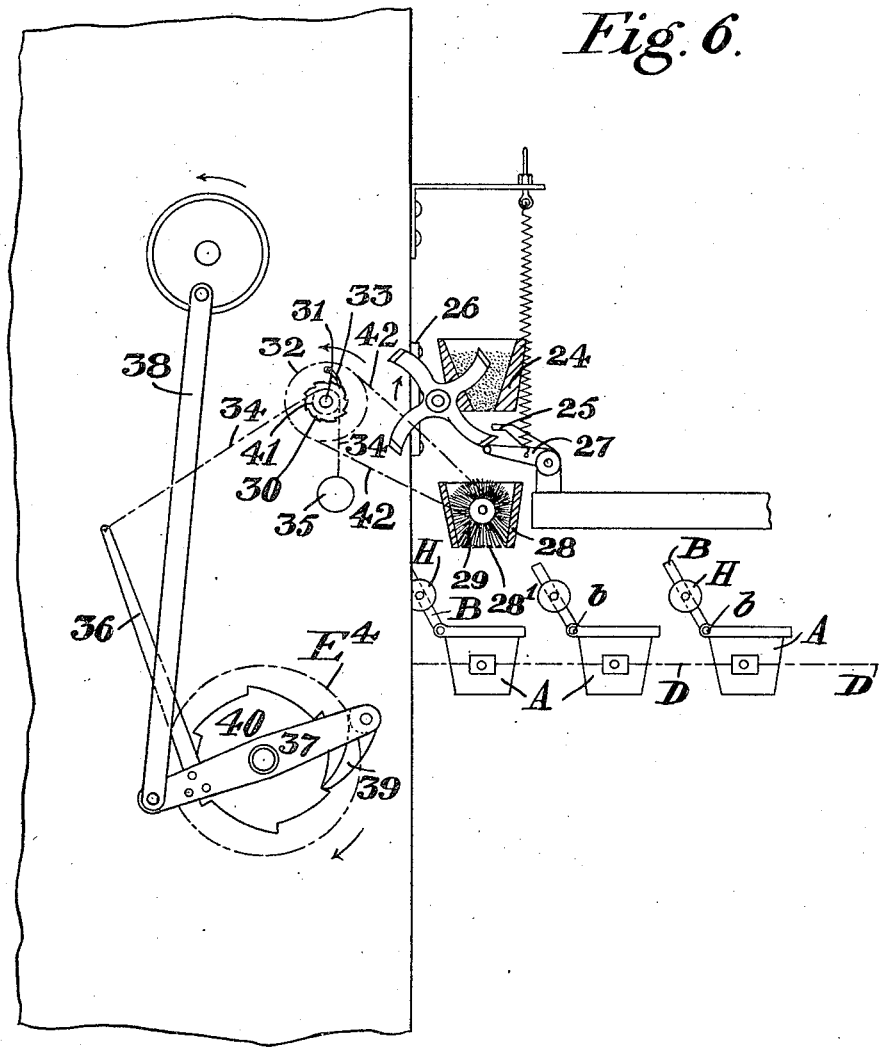

J. CALLOW.
APPARATUS FOR PROVING DOUGH.
APPLICATION FILED FEB. 27, 1909.

1,130,568.

Patented Mar. 2, 1915.
4 SHEETS—SHEET 4.

Witnesses
Mary W. Hammer
Albert Popkins

Inventor
John Callow
By
Sturtevant & Mason
Attorneys

UNITED STATES PATENT OFFICE.

JOHN CALLOW, OF LIVERPOOL, ENGLAND.

APPARATUS FOR PROVING DOUGH.

1,130,568.  Specification of Letters Patent.  Patented Mar. 2, 1915.

Application filed February 27, 1909. Serial No. 480,410.

*To all whom it may concern:*

Be it known that I, JOHN CALLOW, a subject of the King of Great Britain, residing in Liverpool, in the county of Lancaster, in the Kingdom of England, have invented certain new and useful Improvements in or Relating to Apparatus for Proving Dough, of which the following is a specification.

This invention relates to apparatus for proving dough for the manufacture of bread and the like. Hitherto such apparatus has comprised canvas bands or endless conveyer chains having pockets or receptacles for the dough portions suspended therefrom or between, in such manner that the chains take a circuitous course with the dough receptacles hanging vertically from the chains all the time, until they arrive at the discharging end of the machine.

Now the present invention has for its object certain improvements in this class of machine, whereby the dough is prevented from sticking on the receptacles, the dough lumps are repeatedly turned, and the dough is kept more moist to render it better for molding. Sticking has hitherto occasionally taken place through the dough being long at rest in one position in the receptacles. Therefore to avoid this the dough lumps by the present invention are periodically turned as they travel through the machine.

The invention also provides certain improvements in automatically feeding the dough portions to the prover, in delivering the same on to a conveyer or band, that takes the pieces to the molder, and in the devices for dusting the prover trays.

The invention will be understood from the following description reference being had to the accompanying drawings, in which:—

Figure 1:
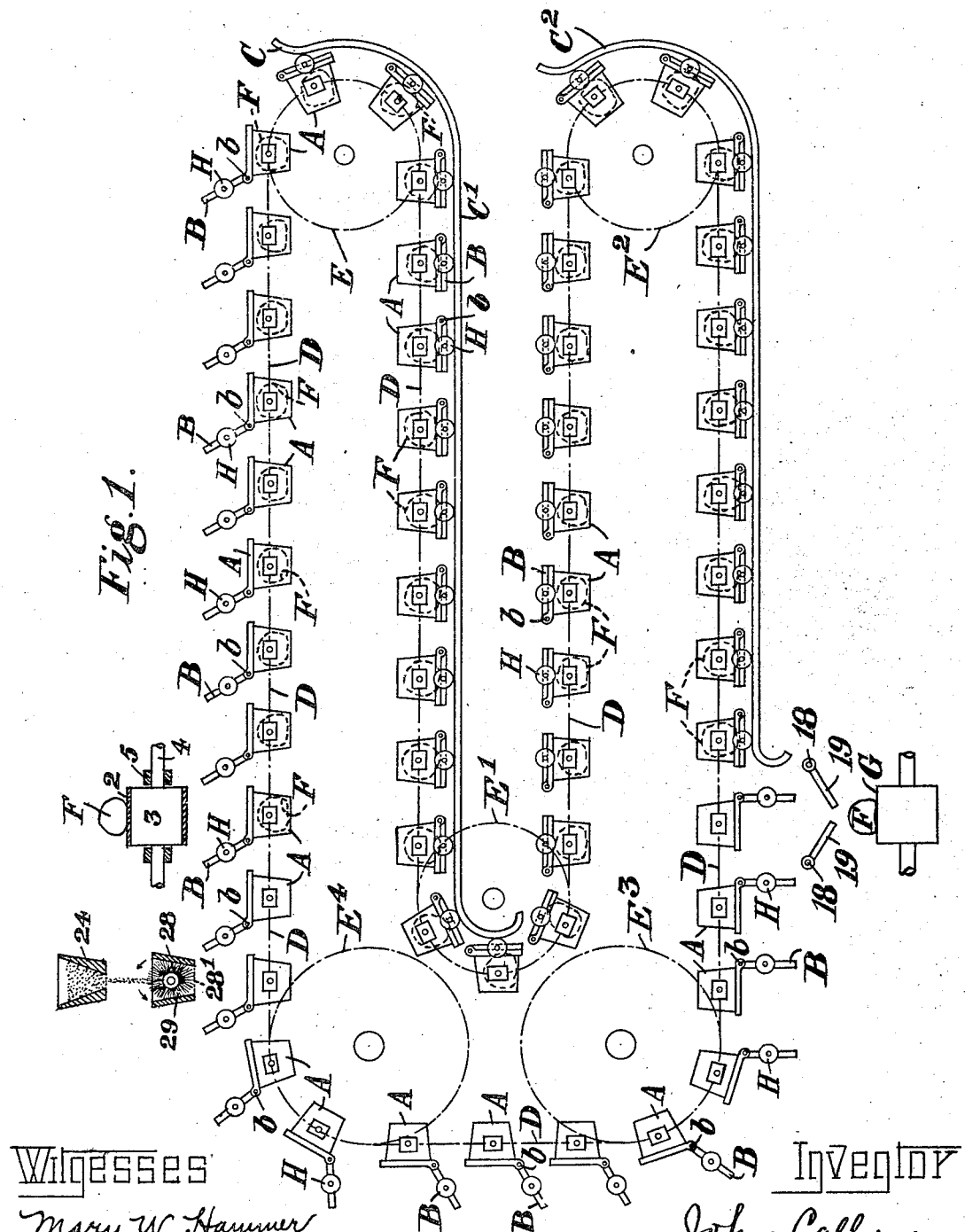
Figure 7:
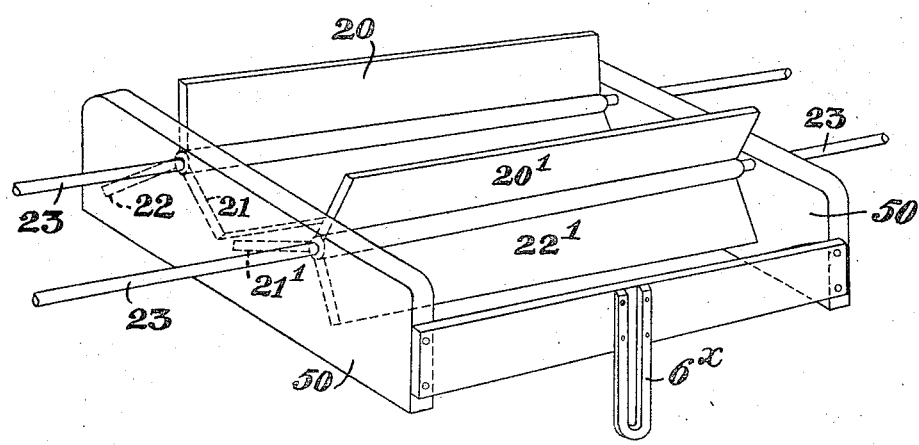

Figure 1 is a front elevation of a proving machine embodying my invention; Fig. 2, a side elevation partly in section, showing the device for automatically delivering a number of pieces of dough into the receptacles of the prover from a divider or elsewhere; Fig. 3, a side elevation of the apparatus for delivering the dough lumps on to a conveyer for delivery to a molder or elsewhere; Fig. 4, a cross section through one form of tray for receiving delivery of dough pieces or delivering the same; Fig. 5, a cross section of a slight modification; Fig. 6, a front view partly in section of the device for dusting the trays of the prover; Fig. 7, a perspective view of another modification of the tray receiving device.

Referring first to Fig. 1, I provide each dough receptacle A with a lid or cover B held closed during the proving operation. The receptacles are not freely suspended from the chains or hands D, but are fixed, so that as the chains D turn round the guide pulleys in their circuitous course, the receptacles A will turn also, and so cause the dough lumps F to turn inside the receptacles A. Thus for example if the receptacles travel up and down in vertical planes, the receptacles will when the chains are traveling upward, hang down with the base of the receptacle at the one side, and the lid at the other. When however they reach the guide pulleys the chains and receptacles pass around them, and travel downward, and the receptacles consequently turn with them, so that the lids are now at the opposite side, and the base at the other, and thus the dough lumps inside the receptacles are turned every time the chains pass around guide pulleys, and yet the dough cannot fall out. It is obvious however that the chains D can be arranged to travel in horizontal planes, and this is the arrangement shown in Fig. 1 of the drawings. Thus for example when the chains D are traveling horizontally after passing the guide pulleys or sprocket wheels E, the receptacles A will hang down with the base of the receptacles at the top and the lids B at the bottom. When however they reach the guide pulleys E' the chains D and the receptacles A pass around them, and travel in a horizontal plane immediately below, and the receptacles consequently turn with them, so that the lids B are now at the top, and the base at the bottom, and thus the dough lumps F inside the receptacles A are turned, every time the chains D pass around the guide pulleys and yet the dough cannot fall out. On arriving at the discharge end of the machine, however, the lids or covers are on the underside, and open automatically, and the dough lumps are discharged by an auxiliary belt G which communicates with the molding machine or table. The lids B then remain open as they pass around pulleys $E^3$ and $E^4$, until they reach the feed end of the machine, where the receptacles are dusted by a sprinkler or brush, and then the receptacles receive the dough lumps from the hander-up or divider. In the course of their farther travel, the lids or covers B fall by gravity and coming against a cam or projection C are held closed. In the drawing this projection C forms the end of a rail or guide bar C', which passing around the pulleys E, follows the travel of the chains D until it reaches the guide pulley E', where the receptacles turn into the upright position, and the rail then stops. Farther on, another rail C² commences at the guide pulleys E² and continues up to the point of delivery. These rails keep the lids closed when the receptacles are inverted, and the arrangement is preferably such, that at the position where the dough lumps are discharged, the dough receptacles are upside down, that is with the lids underneath, and at the place where the dough lumps are fed into the receptacles, the receptacles are right side up, and in the course of their travel through the machine, they are alternately inverted and turned back again, thus turning the dough lumps inside. The lids or covers are hinged at $b$, or can be otherwise arranged, and the lids are provided with antifriction rollers H which, when the lids close, come against the guide rails aforesaid. Another advantage of the lids B is, that they keep the air from the dough in the receptacles, and so keep the dough lumps moist or free from skin, and render them better fitted to be treated in the molder, or at the table.

It must be understood that I do not confine my invention to a lid, as any device which will close the receptacles A and enable the dough portions to be turned inside and prevent them falling out, would come within the scope of my invention. Thus for example a band could be placed under and parallel to the line of dough receptacles, so that when the trays turn upside down the said bend serves as a lid or cover to keep the dough portions in.

When the divider or hander-up does not deliver at each delivery, the number of pieces of dough required to fill a complete row of receptacles A in the prover, then of course some arrangement is needed whereby the divider or hander-up shall make more than one delivery of dough lumps in order to fill a complete row of receptacles in the prover. This may consist of feeding devices located in proximity to the feeding end of the prover, comprising a conveyer band, trough or receiver having a reciprocating, sliding or traversing movement along the line of the dough receptacles, which I will now proceed to more particularly describe reference being had to Figs. 1 and 2.

This conveyer, which by preference consists of a band 2, passes around a pair of guide pulleys or rolls 3 and has a constant traversing motion as above stated. It also has a reciprocatory motion, as above mentioned, that is to say the guide rolls 3 instead of revolving in one uniform position, are arranged to have a reciprocation back and forth. For this purpose the center pin or spindles of the rolls 3 are journaled in blocks or boxes 5 which slide between guide bars 6 first in one direction and then in the opposite direction. As the lumps F drop from the hander 7 on to the conveyer 2, one by one they are carried forward by the revolving of the roll 8 and consequent travel of the conveyer 2, until the desired number of lumps have been delivered on to the conveyer 2, and so long as the rolls 3 reciprocate toward the right, the leading lump F and the succeeding lumps remain in about the same positions relative to the roll 3. When however, the conveyer rolls 3 reach the end of their forward reciprocation, they begin their return reciprocation toward the left, but the conveyer 2 itself, continues to be driven by the roll 8, which revolves in the direction shown by the arrow. Consequently the first dough lump falls off the end of the conveyer 2 into the farthest receptacle A⁷, and then by the reciprocating back of the conveyer rolls 3, and the traversing forward of the conveyer 2, the next lump drops into the next receptacle A⁶, and so on until each tray has its required number of pieces of dough deposited thereon. It is the combined movement, namely the reciprocating back of the conveyer rolls 3, and the traveling forward of the conveyer 2 around the rolls 3, which causes the lumps F to drop off the end of the conveyer 2 each into a separate receptacle A⁷, A⁶, A⁵, and so on. By the time the four lumps shown have fallen into the receptacles A⁷, A⁶, A⁵ and A⁴, more lumps F will have been delivered by the hander 7 on to the conveyer 2, and so the other receptacles A³, A² A¹ and A will be filled. Then when the entire row of receptacles is filled, the rolls 3 reciprocate forward again, and the dough lumps cease falling off the end of the conveyer 2, because during the forward reciprocation of the rolls, the said rolls 3 practically stop revolving, though the driving roll 8 continues to turn. In the interval during which the rolls 3 are reciprocating to the right, and before they begin their return reciprocation to the left, the receptacles A move forward, and an empty set of receptacles take their place.

A convenient plan is to arrange one conveyer roll 3 to reciprocate in a path at right angles to the path of the other roll 3, and to provide the rolls 8 and 9 for the conveyer, at the point where the said conveyer 2 changes its direction of motion, (roll 9 being a mere guide roll, while roll 8 is the driver), also to couple the center spindles of the two traveling rolls 3 together by a coupling chain 10 passing around guide or sprocket pulleys 11 and 12, and driving one of these sprocket pulleys, viz: 12 so as to reciprocate the conveyer rolls 3 one way, then reverse the sprocket pulley 12, so as to reciprocate the rolls 3 the reverse way. The method shown in the drawings of doing this, consists of a cam 14, which on revolving on the shaft 14ˣ works the connecting rod up and down between the guides, and so turns the toothed quadrant 15, (which gear with the pinion 16 on the sprocket pulley 12) in the direction of the arrow, and then turns it in the reverse direction. The oscillation of the quadrant thus imparts the required reciprocation of the rolls 3.

In order to cause the lumps of dough as they issue from the prover to be carried in a continuous stream to the molding machine, a conveyer is usually provided at the delivery end of the prover. This conveyer has hitherto always been a continuously moving one, and it conveys the dough portions to the table or final molding machine. This acts very well if the dough lumps discharge satisfactorily, but occasionally they are a little lazy in discharging from the receptacles, that is if any of the lumps stick to the receptacles some will discharge promptly on to the conveyer while others will delay discharging, and thus when they do discharge, they will fall on to the tops of those already lying on the conveyer. In order to avoid this, I arrange my conveyer G (Figs. 1 and 3) to have an intermittent movement, so that it will pause, and leave time for all the dough lumps to fall on to it, and then travel forward. This intermittent movement can be obtained by means of mutilated wheels, from a part of the perimeter of which the teeth are removed, so that at each revolution the wheels come out of gear and the conveyer stops, but as the driving wheel revolves, it comes into gear again with the driven wheel, and so starts the conveyer again. Any other suitable mechanism may however be used. Also to accomplish the same purpose a tray 19 is placed in the position shown in Figs. 1 and 3, that is, between the receptacles of the prover and the conveyer band G, so that the trays of the prover can discharge themselves into the tray 19. This tray is made of two hinged leaves, so that after every delivery from the prover receptacles, the tray 19 opens, and deposits the pieces of dough on to the conveyer band G. The opening of the tray is postponed a little, so as to leave sufficient time should the dough lumps be a little lazy in falling out of the prover receptacles.

Another form of tray is shown in Fig. 4. This is made with three flanges or wings 20, 21 and 22 pivoted at 23, so that they can turn. The wings extend the whole length of the prover receptacles A, and in one position are held normally as indicated in Fig. 4, so that the wings 20 and 21 form a tray, and catch the lumps as they fall from the receptacles A. Then after a suitable interval by means of any suitable mechanism such as a cam or mutilated wheel, these wings rotate on their axis, a segment of a circle, so as to discharge the lumps on to the conveyer, and the wings 21 and 22 form another tray, to receive a new row of dough lumps and so on.

In Fig. 5 an equivalent arrangement is shown, in which there are two of these devices placed side by side, which collectively form a tray. In the position shown, the wings 20, 21, and 20′, 21′, form the tray, then by turning these wings the segment of a circle, the dough lumps are discharged on to G, and the wings 20, 22 and 20′, 22′, form another trough, to receive the next row of lumps, and so on.

The said devices can, however, be used equally well for feeding the dough lumps to the prover, in which case they would be arranged to slide backward and forward to fill the prover receptacles by their tipping or rotating motion. Owing to their movement, they will deposit, and right themselves for refilling very quickly as would be necessary in a divider that delivers its pieces at a high speed, of say one at a time, and sixty a minute. This is shown in Fig. 7, in which 20, 21 and 20′, 21′, are wings that form the tray adapted to turn in the segment of a circle on their spindles 23. In addition to turning however, these wings have a longitudinal movement on the spindles 23 as well as the intermittent rotary movement. A clutch or endless traveling belt works in the bracket 6 and so operates the boards or end plates 50. Thus at the end of its travel on the spindles 23, the tray receives a dough lump from the divider or hander-up, and is then moved longitudinally by the boards or end plates 50 so as to give room for the next lump to be discharged into the tray, and this goes on until the tray is full and then the wings rotate the segment of a circle and all the dough lumps contained therein are discharged into the trays A of the prover, Figs. 1 and 2. The wings 20, 22 and 20′, 22′, form another trough to receive the next row of lumps, the tray slides back longitudinally, and so on. When this arrangement is used the belt 2 and the pulleys 3 are dispensed with.

The sprinkler for dusting the prover trays is shown in Figs. 1 and 6. In these figures, 24 is a hopper for flour, having at the bottom a fine sieve, through which the flour can only percolate if the hopper or the flour therein be shaken or moved. 25 is a tapper and 26 rotating arms which strike against the spring arm 27, and so cause the tapper 25 to give sharp or rapid knocks to the hopper 24, to shake the flour through the sieve, into the space between the side walls or housings 28, which contain a rotary brush 29 working against a sieve 28'. Each receptacle A of the prover stops for a few moments under the brush, and the brush causes the flour delivered upon it, to be delivered in a fine shower into the receptacles A underneath it. The beater may be arranged to rotate continuously so long as the machine is working, but the brush rotates intermittently, that is only when there are receptacles A underneath it. A plan for imparting this intermittent rotation to the brush is shown in the figure, namely a ratchet wheel 30 mounted freely on the shaft 31. On the said shaft is a fast pulley 32 provided with a pawl 33. Attached to the ratchet wheel is a grooved pulley 41, around which passes the cord 34, at one end of which is the weight 35, and the other end is attached to the arm 36 in one with the oscillating lever 37. This lever is oscillated by the crank 38, and at the other end carries the pawl 39, which engages the ratchet teeth of the wheel 40. The oscillation of the lever 37 drives the pulley or sprocket wheel $E^4$, and so gives an intermittent travel to the chain of receptacles A, and also by means of the arm 36 and cord 34, rotates the loose pulley 41. During the oscillation of the lever 37 therefore, the pulley 32 is rotated in the direction of the arrow, and so rotates the brush by the belt 42, while during the return oscillation of the lever 37 the loose pulley 41 runs idle, being turned by the pull of the weight, and no motion is imparted to the pulley 32, so that the brush stops. This intermittent motion synchronizes of course, with the intermittent motion of the prover receptacles A in this way, that when the brush is revolving, the receptacles A are stationary, and vice versa, which is exactly what is required.

I declare that what I claim is:—

1. A dough proving apparatus comprising in combination a movable carrier, a series of receptacles attached to said carrier one after another, and means for covering said receptacles so that said receptacles will keep the dough moist when closed, the arrangement being such that said receptacles will be turned during the travel of the carrier and that the dough will be discharged from said receptacles when in their lowest position.

2. A dough proving apparatus comprising in combination a movable carrier, receptacles attached to said carrier, means for covering said receptacles so that said receptacles will keep the dough moist when closed, the arrangement being such that the receptacles will be turned a plurality of times during the travel of the carrier and that the dough will be discharged after the last inversion of said receptacles.

3. A dough proving apparatus comprising in combination a movable carrier, receptacles attached to said carrier, means for covering said receptacles so that said receptacles will keep the dough moist when closed, a dough divider adapted to deliver charges of dough of substantially smaller volume than the internal volume of said receptacles when closed, means to feed said dimensioned charges of dough into said receptacles, the arrangement being such that the receptacles will be turned a plurality of times during the travel of the carrier.

4. A dough proving apparatus comprising in combination a movable carrier, receptacles attached to said carrier, means for covering said receptacles so that said receptacles will keep the dough moist when closed, means to form charges of dough of substantially smaller volume than the internal volume of said receptacles when closed, means to feed said dimensioned charges to the receptacles, the arrangement being such that the receptacles will be turned a plurality of times during the travel of the carrier.

5. A dough proving apparatus comprising in combination a movable carrier, a series of receptacles attached to said carrier one after another, means for covering said receptacles so that said receptacles will keep the dough moist when closed, means to form charges of dough of substantially smaller volume than the internal volume of said receptacles when closed, means to feed said dimensioned charges to the receptacles, the arrangement being such that the receptacles are turned during the travel of the carrier.

6. A dough proving apparatus comprising in combination a movable carrier, a series of receptacles attached to said carrier one after another, means for covering said receptacles so that said receptacles will keep the dough moist when closed, means for forming charges of dough of a volume substantially smaller than the internal volume of said receptacles when closed, the arrangement being such that the receptacles are turned during the travel of the carrier and that the dough is discharged while said receptacles are upside down.

7. A dough proving apparatus comprising in combination a movable carrier, receptacles attached to said carrier, means for covering said receptacles so that said receptacles will keep the dough moist when closed, means for forming charges of dough of a volume substantially smaller than the internal volume of said receptacles when closed, means for feeding said dimensioned charges to the receptacles, the arrangement being such that said receptacles are turned a plurality of times during the travel of the carrier and that the dough is discharged while said receptacles are upside down.

8. A dough proving apparatus comprising in combination a movable carrier, a series of receptacles attached to said carrier one after another, means for covering said receptacles so that said receptacles will keep the dough moist when closed, the arrangement being such that the receptacles are turned during the travel of the carrier and that the dough is discharged by the action of gravity.

9. A dough proving apparatus comprising in combination a movable carrier, receptacles attached to said carrier, means for covering said receptacles so that said receptacles will keep the dough moist when closed, a divider adapted to deliver charges of dough of a volume substantially smaller than the internal volume of said receptacles when closed, means for feeding said dimensioned charges to the receptacles, the arrangement being such that the receptacles are turned during the travel of the carrier and that the dough is discharged by the action of gravity.

10. A dough proving apparatus comprising in combination a movable carrier, receptacles attached to said carrier, means for covering said receptacles so that said receptacles will keep the dough moist when closed, the arrangement being such that the receptacles first move on said carrier in an upright position, then in an inverted position, then in an upright position again and finally in an inverted position and that the discharge of the dough takes place after the last inversion.

11. A dough proving apparatus comprising in combination an endless conveyer, means to move said conveyer, guide wheels adapted to guide said conveyer in a circuitous course, receptacles fixed to said conveyer, said guide wheels being located so that said receptacles will be turned a plurality of times during the movement of said conveyer, means for covering said receptacles so that said receptacles will keep the dough moist when closed, the arrangement being such as to open said receptacles at the lowest point of their travel.

12. A dough proving apparatus comprising in combination an endless conveyer, means to move said conveyer, guide wheels adapted to move said conveyer in a circuitous course, receptacles fixed to said conveyer, means for covering said receptacles so that said receptacles will keep the dough moist when closed, means for forming charges of dough of a volume substantially smaller than the internal volume of said receptacles when closed, means to feed said dimensioned charges to said receptacles, said guiding wheels being located so that said receptacles will be turned a plurality of times during the movement of said conveyer.

13. A dough proving apparatus comprising in combination a movable carrier, receptacles attached to said carrier, means to guide said carrier so that said receptacles are turned a plurality of times during the travel of the carrier, lids hinged to said receptacles, means adapted to coöperate with said lids so that the receptacles are open for feeding but are then closed in substantially air-tight manner until discharged.

14. A dough proving apparatus including in combination, a movable dough carrier having receptacles fixed thereto, of a device for dusting the receptacles, said device including a receptacle open at its top and bottom, a brush arranged within said receptacles, means for intermittently delivering flour to the brush, and means for rotating said brush when the receptacles of the carrier are underneath the discharge opening for throwing a shower of flour into the dough receptacles, said rotating means remaining at rest when said prover receptacles are moved from underneath the dusting receptacle.

15. A dough proving apparatus comprising in combination an endless conveyer, means to move said conveyer intermittently in a circuitous course, receptacles attached to said conveyer, means for covering said receptacles so that said receptacles will keep the dough moist when closed, the arrangement being such that the receptacles are turned during the travel of the conveyer and that the receptacles open at the lowest point of their travel.

16. A dough proving apparatus comprising in combination an endless conveyer, a series of receptacles attached to said conveyer one after another, means for covering said receptacles so that said receptacles will keep the dough moist when closed, means to form charges of dough of substantially smaller volume than the internal volume of said receptacles when closed, means to feed said dimensioned charges to the receptacles, the arrangement being such that the receptacles are turned during the travel of the conveyer.

17. A dough proving apparatus comprising in combination an endless conveyer, means to move said conveyer intermittently, a series of receptacles attached to said conveyer one after another, means for covering said receptacles so that said receptacles will keep the dough moist when closed, means to form charges of dough of substantially smaller volume than the internal volume of said receptacles when closed, means to feed said dimensioned charges to the receptacles, the arrangement being such that the receptacles are turned during the travel of the conveyer.

18. A dough proving apparatus comprising in combination an endless conveyer, means to move said conveyer intermittently in a circuitous course, receptacles having a plurality of compartments transverse to the conveyer and attached to said conveyer, means for covering said receptacles so that said receptacles will keep the dough moist when closed, the arrangement being such that the receptacles are turned during the travel of the conveyer and that the receptacles open at the lowest point of their travel.

19. A dough proving apparatus comprising in combination an endless conveyer, a series of receptacles having a plurality of compartments transverse to the conveyer and attached to said conveyer one after another, means for covering said receptacles so that said receptacles will keep the dough moist when closed, means to form charges of dough of substantially smaller volume than the internal volume of said receptacles when closed, means to feed said dimensioned charges to the receptacles, the arrangement being such that the receptacles are turned during the travel of the conveyer.

20. A dough proving apparatus comprising in combination an endless conveyer, a series of receptacles having a plurality of compartments transverse to the conveyer and attached to said conveyer one after another, and means for covering said receptacles so that said receptacles will keep the dough moist when closed, the arrangement being such that said receptacles will be turned during the travel of the conveyer and that the dough will be discharged from said receptacles when in their lowest position.

21. A dough proving apparatus comprising in combination an endless conveyer, means to move said conveyer intermittently, a series of receptacles having a plurality of compartments transverse to the conveyer and attached to said conveyer one after another, means for covering said receptacles so that said receptacles will keep the dough moist when closed, means to form charges of dough of substantially smaller volume than the internal volume of said receptacles when closed, means to feed said dimensioned charges to the receptacles, the arrangement being such that the receptacles are turned during the travel of the conveyer.

22. A dough proving apparatus comprising in combination an endless conveyer, means to move said conveyer intermittently, a series of receptacles having a plurality of compartments transverse to the conveyer and attached to said conveyer one after another, and means for covering said receptacles so that said receptacles will keep the dough moist when closed, the arrangement being such that said receptacles will be turned during the travel of the conveyer and that the dough will be discharged from said receptacles when in their lowest position.

23. A dough proving apparatus comprising in combination a movable carrier, receptacles having a plurality of compartments transverse to the carrier and attached to said carrier, means for covering said receptacles so that said receptacles will keep the dough moist when closed, the arrangement being such that the receptacles will be turned a plurality of times during the travel of the carrier and that the dough will be discharged after the last inversion of said receptacles.

24. A dough proving apparatus comprising in combination a movable carrier, a series of receptacles having a plurality of compartments transverse to the carrier and attached to said carrier one after another, means for covering said receptacles so that said receptacles will keep the dough moist when closed, the arrangement being such that said receptacles are turned during the travel of the carrier and that the dough is discharged by the action of gravity.

25. A dough proving apparatus comprising in combination a movable carrier, receptacles having a plurality of compartments transverse to the carrier and attached to said carrier, means to guide said carrier so that said receptacles are turned a plurality of times during the travel of the carrier, lids hinged to said receptacles, means adapted to coöperate with said lids so that the receptacles are open for feeding but are then closed in substantially air-tight manner until discharged.

In witness whereof, I have hereunto signed my name this 12 day of February 1909, in the presence of two subscribing witnesses.

JOHN CALLOW.

Witnesses:
H. D. JAMISON,
T. L. RANDS.